March 24, 1959     K. BLANZ     2,879,416

ELECTRIC MOTOR DRIVE

Filed June 1, 1956

INVENTOR
Kurt Blanz
By Henry K. Feith
Attorney

United States Patent Office 2,879,416
Patented Mar. 24, 1959

2,879,416

ELECTRIC MOTOR DRIVE

Kürt Blanz, Stuttgart, Germany, assignor to Krauss & Reichert, Spezialmaschinenfabrik und Apparatebau, Stuttgart-Bad Cannstatt, Germany Application June 1, 1956, Serial No. 588,847

Claims priority, application Germany July 8, 1955

6 Claims. (Cl. 310—77)

This invention relates to electric motor drives and more particularly to electric motor drives adapted for the intermittent or stepwise operation of devices or arrangements of various kinds.

The inventive electric motor drive may particularly advantageously be employed for the intermittent actuation of electric switches or the like.

It is an object of this invention to provide an electric motor drive operating in stepwise manner, wherein the torque of the motor may be directly transmitted by means of the driving shaft of the motor to a switch or the like arrangement to be actuated or driven in stepwise manner, without requiring the interposition of coupling means, reducing gears or the like.

A further object of the invention is the provision of an electric motor drive operating in stepwise manner for the purpose referred to, which is simple in construction, comprises but a few elements and is relatively inexpensive to manufacture and to assemble.

Moreover, it is an object of this invention generally to improve on electric motor drives operating in stepwise or intermittent manner, as now customarily constructed.

Figure 1:
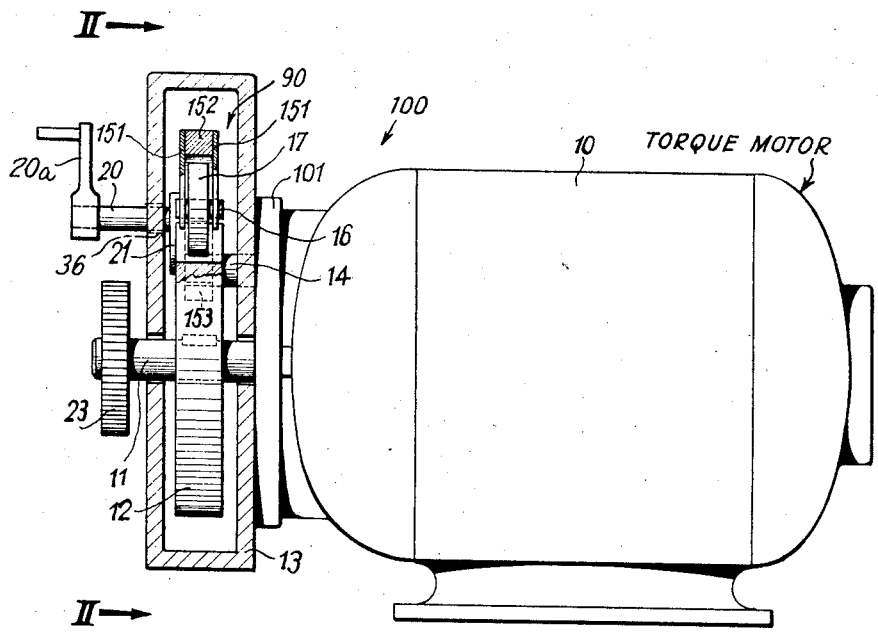
Figure 2:
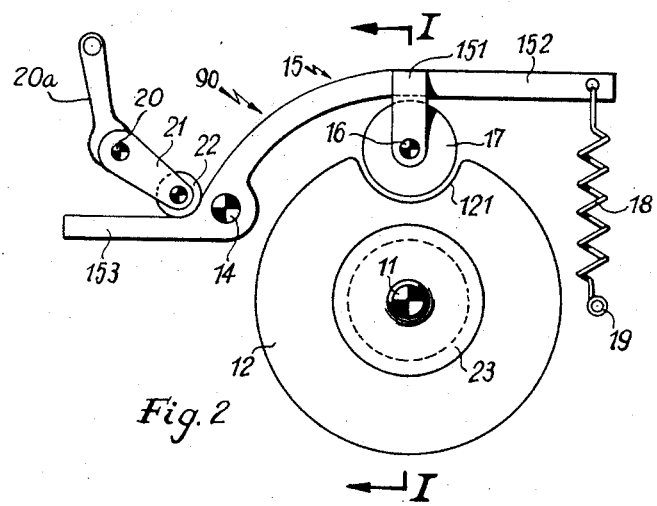

Other objects, advantages and structural details of the invention will become apparent from the following description when read in conjunction with the accompanying drawings forming part of this specification, wherein:

Fig. 1 is a side elevational view partly in section of a preferred embodiment of the inventive electric motor drive, the section being taken on line I—I of Fig. 2, and Fig. 2 is an end view seen in the direction of the arrows II of Fig. 1, the casing of the blocking arrangement of the inventive drive, however, being omitted.

Referring now to Figs. 1 and 2, reference numeral 100 generally indicates an electric motor drive. The electric motor drive 100 comprises a torque motor or three-phase induction motor schematically and generally indicated by reference numeral 10 and a blocking arrangement generally indicated by reference numeral 90.

A portion of the driving shaft 11 of the torque motor or brake lifting motor 10 protrudes from the housing of the latter. A gear 23 is keyed to the driving shaft 11 near its extreme protruding end. This gear 23 is adapted to be operatively associated with an arrangement or device (not shown) destined to be actuated or driven in an intermittent manner, for example a switch, for the purpose of transferring the driving torque of the motor 10 to this arrangement or device.

The housing of the motor 10 has at one end face thereof, i.e. the left-hand end face in Fig. 1, a flange portion 101 to which a casing or support 13 is flanged or otherwise rigidly secured. This casing or stationary means 13 accommodates the blocking arrangement 90 previously referred to. The blocking arrangement 90 includes a first locking member or cam disc 12 carried by the driving shaft 11. The cam disc 12 has a substantially circular circumference and is provided with a substantially arcuate recess 121, the purpose of which will be explained below.

A pivot pin 14 is journalled in the wall of the casing 13 and a two-armed lever 15 comprising arms 152 and 153 is mounted on the pivot pin 14. The longer, slightly curved arm 152 of the lever 15 is provided with two plate-like projections 151, one at each side of the arm 152. The shaft 16 of a disc-shaped roller or second locking means 17 is journalled in bearing bores provided in the projections 151 which latter form a fork-shaped bearing structure. As will be seen best in Fig. 2, the diameter of the roller 17 substantially corresponds to or is slightly smaller than that of the arcuate recess 121 of the cam disc 12. The upper end of a tension spring 18 is hooked into a bore 34 provided in the arm 152 near its free end, while the lower end of the spring 18 is secured to the wall of the casing 13 by means of a pin 19. The spring 18 constitutes a biasing means which constantly urges the arm 152 of the lever 15 to turn about its pivot 14 towards the cam disc 12, whereby the roller 17 is pressed against the circumferential surface of the cam disc 12. When the cam disc 12 is in a position in which the recess 121 is in register with the roller 17, the latter snaps into the recess 121 so that a portion of the circumferential surface of the roller 17 will bear against the defining walls of the recess 121. The cam disc 12 and with it the driving shaft 11 are thus prevented from rotating, resulting in the blockage of the torque motor 10 which in such blocked condition produces a constant torque when an electric source is connected with the motor. Figs. 1 and 2 illustrate the motor in the blocked condition.

The actuating means for actuating the blocking arrangement will now be described. A further shaft 20 is rotatably mounted in a bearing bore 36 of the casing 13. This shaft 20 has an end portion projecting from the casing 13, to which end portion a handle 20a or the like manually operable means is fixed. The other end portion of the shaft 20 extends within the casing 13 and carries an arm 21. A roller 22 is rotatably mounted on the arm 21 near its free end. Normally, that is when the inventive electric motor drive is inoperative, the roller 22 bears on the shorter arm 153 of the lever 15. When the handle 20a or the like actuating member is turned in either direction, the arm 21 and with it the roller 22 is rocked about the pivot axis 20, whereby the roller 22 presses against the arm 153 of the lever 15 and thus causes a rocking movement of the lever 15 about the pivot axis 14 in anti-clock-wise direction against the force of the spring 18. This rocking movement of the lever 15 in turn causes a movement of the roller 17 in a direction away from the cam disc 12, whereby the roller 17 is disengaged from the recess 121 and the driving shaft 11 with the cam disc 12 is thus released and can freely rotate. The blocking of the motor 10 is thus discontinued. However, due to the particular arrangement of the actuating means 20, 21, 22 and double-armed lever 15 relative to each other, the roller 22 is always urged beyond its lowest position by the spring 18 acting on the double-armed lever 15, so that the roller 17 carried by the arm 152 of the double-armed lever 15 will be pressed against the circumferential surface of the cam disc 12 and will snap into the recess 121 as soon as it is in register therewith. After a complete rotation through 360° the torque motor 10 is thus blocked again.

The operation of the embodiment of the inventive electric motor drive here shown and described is as follows:

The gear 23 keyed to the driving shaft 11 of the torque motor 10 is operatively associated with a switch (not shown) or other arrangement which is to be actuated or driven in a stepwise manner. The drive arrangement is normally in the position shown in the drawings in which the motor is blocked. When the switch (not shown) or other arrangement is to be actuated, the handle 20a of the shaft 20 is turned, whereby due to the action of the roller 22 on the arm 153 the motor 10 is unblocked so that the motor shaft 11 with the gear 23 is rotated. The torque of the motor 10 is thus transmitted to the switch or other arrangement by the gear 23, whereby the switch or other arrangement is actuated. As has been explained, the torque motor 10 will again be blocked after one complete rotation of the motor shaft 11.

Although only single recess 121 has been shown in the embodiment illustrated in the drawings, it will be realized that it is feasible to distribute on the circumference of the cam disc 12 several such recesses which may be spaced at uniform or non-uniform distances from each other. In case several such recesses are provided, then the motor may be blocked again after the motor shaft 11 has rotated less than one complete rotation, i.e. it may be blocked after a rotation through a fraction of 360°.

From above description it will be realized, that the inventive drive comprises a torque motor which is normally blocked by blocking means acting on the motor shaft while the release or unblocking of the motor is effected by actuating means and renewed blocking is automatically effected by the provision of biasing means when the motor shaft has rotated through a predetermined angle of rotation.

I have described preferred embodiments of my invention, but it is understood that this disclosure is for the purpose of illustration rather than for the purpose of limitation and that various omissions or changes in shape, proportion and arrangement of parts, as well as the substitution of equivalent elements for those herein shown and described may be made without departing in any way from the spirit and scope of the invention as set forth in the appended claims.

What I claim is:

1. The combination of an electric motor drive and a stallable electric motor capable of intermittent operation for stepwise predetermined angular rotation of a device, comprising in combination, a stallable motor including a driving shaft, said stallable motor being operative to exert a constant torque when energized and blocked at standstill condition, a cam disc rigidly mounted on said driving shaft, said disc having at least one peripheral recess, blocking means engageable in said recess, said blocking means being supported by a rockable lever, said lever being rockable between an operative position in which said blocking means engages said recess and an inoperative position in which said blocking means is not in contact with said cam disc, biasing means pulling said lever and said blocking means toward said cam disc into said operative position, and movable actuating means capable of moving said biased blocking means into said inoperative position.

2. The combination of an electric motor drive and a stallable electric motor capable of intermittent operation for stepwise predetermined angular rotation of a device according to claim 1 wherein said blocking means consist of a rotatable roller mounted on said rockable lever.

3. The combination of an electric motor drive and a stallable electric motor capable of intermittent operation for stepwise predetermined angular rotation of a device according to claim 4 wherein said actuating means comprises a manually operable actuating member pivotally mounted on said stationary means.

4. The combination of a motor drive and stallable electric motor for an intermittent operation of stepwise predetermined angular rotation of a device as claimed in claim 1, including stationary means, said biased rockable lever including two arms, one of said arms being pivotally mounted on said stationary means and said blocking means mounted on one arm of said lever, said actuating means being capable of bearing on the other arm of said two-armed lever, said blocking means normally cooperating with said cam disc for blocking said driving shaft, and said actuating means being capable of rocking said two-armed lever about its pivotal mounting for disengaging said second blocking means from said cam disc.

5. In an electric motor drive as claimed in claim 4, said actuating means comprising a manually operable member pivotally mounted on said stationary means, and anti-friction means mounted on the free end of said member, said member being rockable along a path in which said anti-friction means intersect the normal position of said other arm of said two-armed lever at at least one zone to slide therealong for rocking said two-armed lever about its pivotal connection and disengaging said blocking means from said cam disc.

6. An electric motor drive for intermittent operation of a device, comprising in combination: a driving shaft, said driving shaft being operative to exert a constant torque when said motor drive is energized and blocked at standstill condition, operative position and an inoperative position, said blocking means being operative to yieldably block said driving shaft in its operative position and to release said driving shaft in its inoperative position, biasing means engaged with said blocking means for urging same into its operative position, and movable actuating means capable of temporarily moving said blocking means into said inoperative position against the force of said biasing means, said biasing means returning said blocking means into said operative position upon termination of the action of said actuating means,

References Cited in the file of this patent

UNITED STATES PATENTS

| | | |
|---|---|---|
| 1,823,555 | Naul | Sept. 15, 1931 |
| 2,440,322 | Barcroft et al. | Apr. 27, 1948 |
| 2,633,777 | Hoern | Apr. 17, 1953 |
| 2,674,062 | Tull | Apr. 6, 1954 |
| 2,709,504 | Mamo | May 31, 1955 |